United States Patent
Schuster et al.

(10) Patent No.: US 7,011,438 B2
(45) Date of Patent: Mar. 14, 2006

(54) ILLUMINATION DEVICE

(75) Inventors: Kurt Schuster, Reutlingen (DE); Petra Heinbuch, Stuttgart (DE); Ralf Ackermann, Reutlingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 71 days.

(21) Appl. No.: 10/938,641

(22) Filed: Sep. 13, 2004

(65) Prior Publication Data
US 2005/0030733 A1    Feb. 10, 2005

Related U.S. Application Data

(63) Continuation of application No. 10/408,042, filed on Apr. 7, 2003, now abandoned.

(30) Foreign Application Priority Data
Apr. 5, 2002  (DE) .................. 102 15 039

(51) Int. Cl.
*B60Q 1/00*  (2006.01)
(52) U.S. Cl. .................. 362/507; 362/494; 362/545
(58) Field of Classification Search ................ 362/494, 362/543–545, 296–298, 507, 516, 520
See application file for complete search history.

(56) References Cited

U.S. PATENT DOCUMENTS

| 6,299,333 B1 * | 10/2001 | Pastrick et al. ............. 362/494 |
| 6,637,921 B1 * | 10/2003 | Coushaine .................. 362/517 |
| 6,682,211 B1 * | 1/2004 | English et al. .............. 362/545 |
| 2002/0118548 A1 * | 8/2002 | Kuenstler et al. ........... 362/518 |

* cited by examiner

*Primary Examiner*—Ali Alavi
(74) *Attorney, Agent, or Firm*—Paul Vincent

(57) ABSTRACT

A method for operating an illumination device as a day travelling light, in particular for automotive vehicles, wherein the device comprises a light source in an illumination housing and a means associated with the light source for bundling the light emitted by the light source, utilizes a light source comprising at least one LED (13).

9 Claims, 2 Drawing Sheets

ILLUMINATION DEVICE

This application is a continuation of Ser. No. 10/408,042 filed Apr. 7, 2003, now abandoned, and claims Paris Convention priority DE 102 039.7 filed Apr. 5, 2002 the entire disclosures of which are both hereby incorporated by reference.

BACKGROUND OF THE INVENTION

The invention concerns a method for operating an illumination device as a day travelling light for automotive vehicles, comprising a light source in a light housing and means for bundling the light emitted by the light source.

Conventional illumination devices in automotive vehicles have light bulbs as light sources. These light bulbs consume a relatively large amount of energy and therefore consume a relatively large amount of fuel during operation. This relatively high consumption is significant, particularly in view of the day travelling light regulations prescribed by law. If automotive vehicle lights must be switched on not only at night but also during the day, fuel consumption increases and results in an additional burden to the environment due to the increased pollutant emissions.

Conventional light bulbs only have a relatively limited service life and lead to recurring costs for the driver to replace burned-out light bulbs.

It is therefore the underlying purpose of the invention to improve a method for operating an illumination device of the above-mentioned type by reducing its energy consumption and increasing the service life of the light source for use as a day travelling light.

SUMMARY OF THE INVENTION

The invention solves this object with a method for operating a day travelling light, in particular for automotive vehicles, comprising a light source in a light housing and with a means for bundling the light emitted by the light source into a light radiation direction, wherein the illumination device is characterized in accordance with the invention in that the light source comprises at least one LED.

LED's consume little energy when emitting light. They thereby reduce fuel consumption for use in the vehicle as a day travelling light. Moreover, LEDs have a considerably longer service life than do conventional light bulbs. Illumination devices comprising LEDs therefore require almost no maintenance. LEDs per se are of relatively small size and therefore reduce the space required for the illumination device. The LEDs can be disposed in different ways to thereby obtain new design effects. Illumination devices comprising LEDs therefore meet the requirements for a characteristic illumination design for a given specific vehicle type, a feature which has become increasingly important for motor vehicles, and therefore for the identification and recognition value of the brand.

To maximize the light yield produced by LEDs, the illumination device may comprise a reflector as means for bundling the light generated by the LEDs.

If only little space is available, the at least one LED can be installed in a Cassegrain optics. The at least one LED thereby irradiates light onto a convex mirror which is disposed in front of the LED in the direction of the emitted light and the light is reflected in the opposite direction onto a parabolic mirror before it exits the illumination device. The light is thereby "folded".

The illumination device can also be provided with a Fresnel optics as a means for bundling the light when only little space is available.

When the day travelling light is disposed in an exterior mirror of the vehicle, the space available for the illumination device is extremely restricted. The use of Fresnel optics on the covering plate of the mirror housing is thereby particularly advantageous.

It is also possible to dispose several LEDs around a conventional light, e.g. a low beam, a high beam or a fog light which may e.g. comprise PES modules or reflection modules. In this fashion, conventional light sources can be combined with LEDs in a common illumination device. Such an arrangement can provide the vehicle with an illumination design which is characteristic for the respective vehicle brand.

White LEDs have the largest light yield. In principle, day travelling light should be white, but yellow light is also acceptable.

Different embodiments of illumination devices for use in the method in accordance with the invention are described in detail below with reference to the accompanying drawing. The individual features are essential to the invention individually and also in arbitrary combination.

DESCRIPTION OF THE PREFERRED EMBODIMENT

Figure 1:
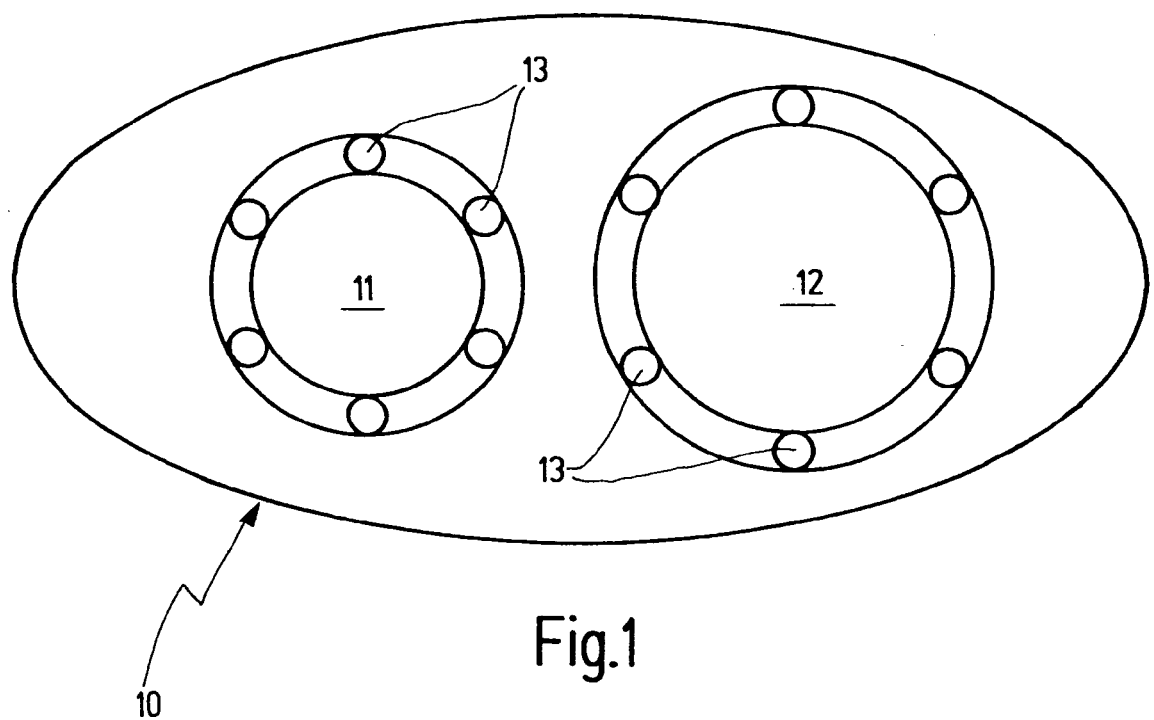
FIG. 1 shows a first embodiment of an illumination device for use in the inventive method.

FIG. 1 shows an illumination device 10 comprising a high beam 11 and a PES low beam module 12. The high beam 11 and the PES module 12 comprise conventional light bulbs and electric discharge lamps which are disposed in the first focus of a respective associated reflector. LEDs 13 are disposed around the high beam 11 and the PES module 12. They serve e.g. as day travelling lights when the high beam 11 and PES 12 are not in use. The exclusive use of LEDs 13 instead of conventional lights during the day considerably reduces fuel consumption and pollutant emission since the LEDs require only little energy. When the available space is sufficiently large, the LEDs can also be installed in reflectors (FIG. 3) such that the legal regulations for technical illumination devices in automotive vehicles are met, with the reflector bundling the light beams generated by the LEDs. Arrangement of LEDs around the high beam and PES provides the respective vehicle type with a distinctive brand-specific illumination design when the LEDs are switched on.

Figure 2:
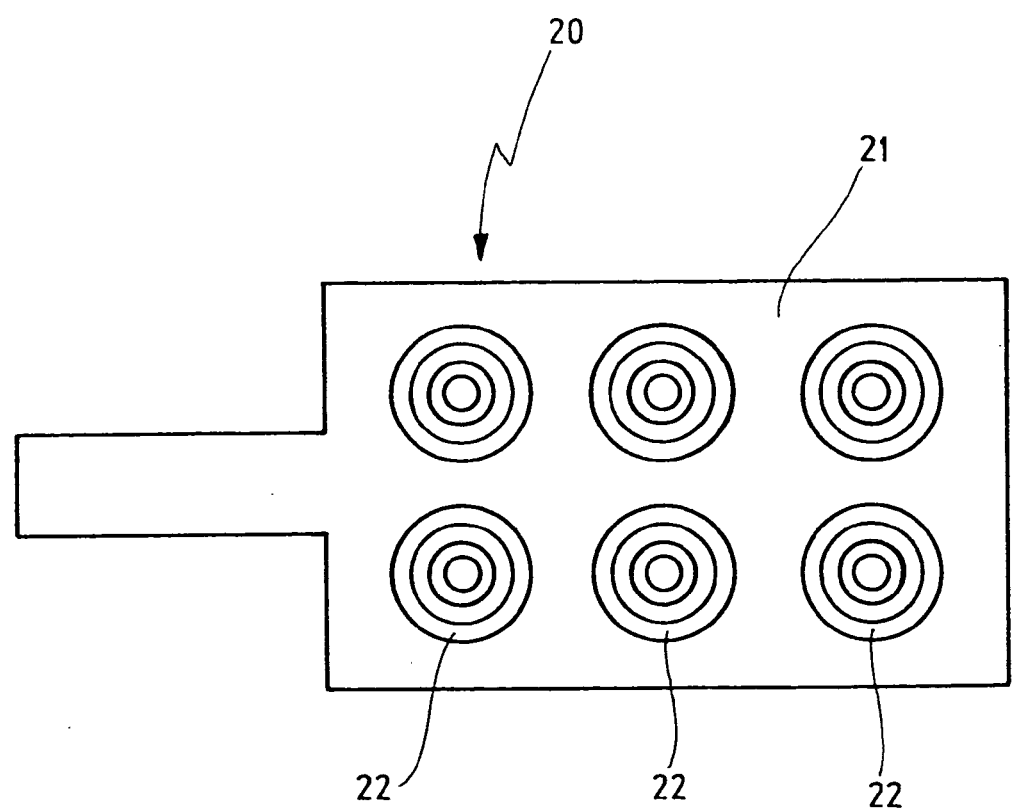
FIG. 2 shows a second embodiment of an illumination device for use in the inventive method.

FIG. 2 shows a vehicle exterior mirror 20 whose housing has a cover plate 21 provided with a Fresnel optics 22. LEDs (not shown in detail) are located behind the Fresnel optics in the mirror housing. The light beams generated by the LEDs impinge directly on the Fresnel optics 22 and are refracted by these in the desired direction before they leave the illumination device. Since a vehicle exterior mirror provides only extremely little space for an illumination means, the combination of LEDs with Fresnel optics 22 is particularly suited to obtain optimum illumination, even if the space is minimal. Since the cover plate 21 and the Fresnel optics disposed thereon may be produced from plastic material, mass production at low cost is possible.

Figure 3:
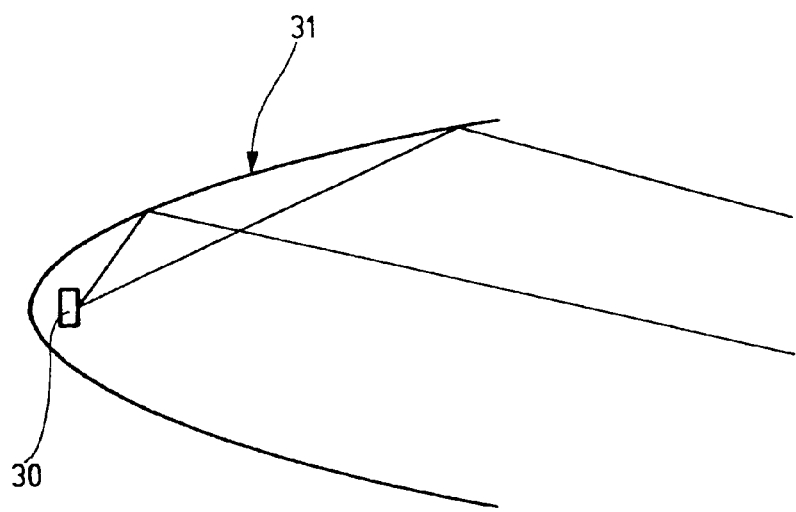
FIG. 3 shows an LED in a reflector.

FIG. 3 shows an LED 30 which is disposed in a reflector 31 as e.g. can be the case for LEDs disposed about a PES (FIG. 1). The reflector 31 bundles the light beams generated by the LED 30 such that the legal requirements for technical illumination devices are met. The combination of an LED 30 with a reflector 31 is reasonable when more space is available than e.g. in a vehicle exterior mirror.

Figure 4:
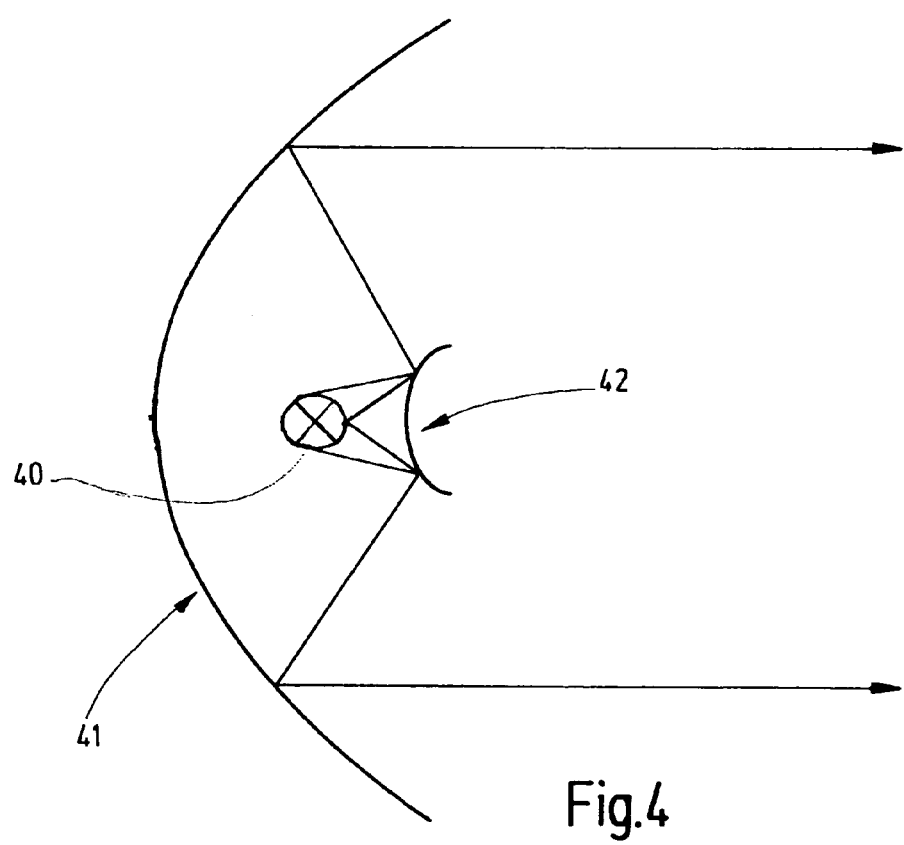
FIG. 4 shows an LED in a Cassegrain optics.

If the space is relatively limited, the LED may be installed in an optics according to the Cassegrain principle (FIG. 4). The LED 40 may thereby be disposed at the focus of a parabolic mirror 41 (concave mirror). It is also possible to locate the LED away from the focus of the concave mirror and between the mirrors or outside of the concave mirror, displaced against the direction of the light emitted by the overall optics, i.e. behind the concave mirror. The light beams generated by the LED 40 thereby impinge on a free shape convex mirror 42 from which they are reflected towards a free shape concave mirror, e.g. a parabolic mirror, and subsequently exit through a cover plate of the illumination device (not shown in detail). The image of the LED produced by the concave mirror, which must not necessarily be sharp, must be disposed in the "focus" of the free shape concave mirror. The image is only sharp when the convex mirror has a hyperbolic shape.

We claim:

1. A method for operating a illumination device of an automotive vehicle, the method comprising the step of:
   operating the illumination device as a day travelling light, the illumination device being switched on during daylight use of the vehicle and without any one of a low beam, a high beam and a fog light being in operation, wherein the illumination device comprises an illumination housing disposed in a head light region of the vehicle and a light source disposed in said illumination housing, said light source having at least one LED which is switched on during operation of the illumination device as a day travelling light, and with means for directing light emitted by said light source.

2. The method of claim 1, wherein said directing means comprises a reflector.

3. The method of claim 1, wherein said at least one LED is installed in an optics having a Cassegrain mirror reflector geometry.

4. The method of claim 1, wherein said directing means comprises a Fresnel optics.

5. The method of claim 1, further comprising operating a second illumination device disposed as a second day travelling light in an external mirror, said second illumination device having a second light source with at least one second LED and with second means for directing light emitted by said second light source.

6. The, method of claim 5, wherein said second directing means comprises a Fresnel optics disposed in a covering plate of said external mirror.

7. The method of claim 1, further comprising an additional illumination means, wherein the day travelling light comprises several LEDs disposed about said additional illumination means.

8. The method of claim 7, wherein said additional illumination means comprises one of a low beam, high beam, and a fog light module.

9. The method of claim 1, wherein said at least one LED is white.

* * * * *